Patented Mar. 27, 1928.

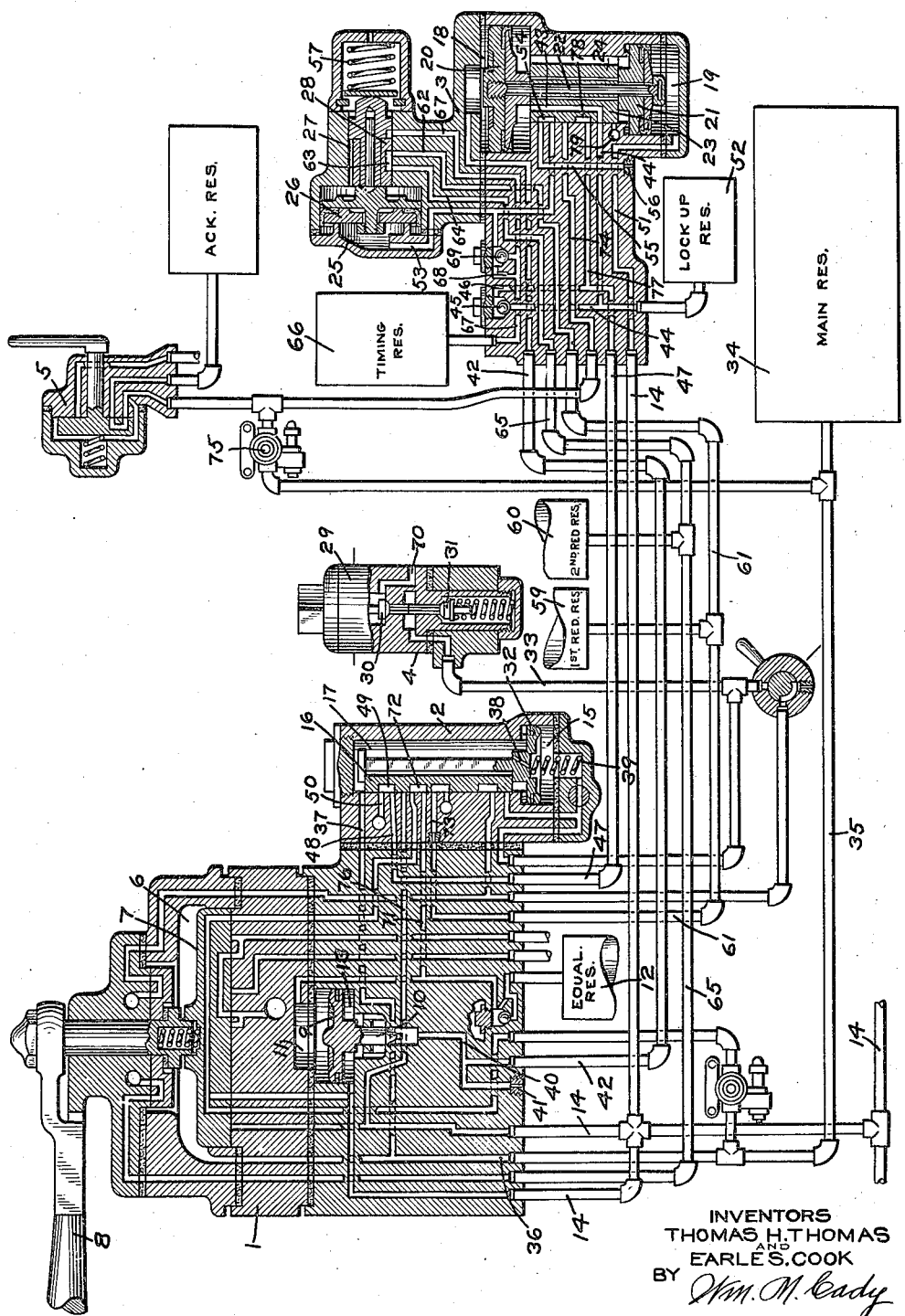

1,663,736

UNITED STATES PATENT OFFICE.

THOMAS H. THOMAS, OF EDGEWOOD, AND EARLE S. COOK, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA.

FLUID-PRESSURE-BRAKE DEVICE.

Application filed May 14, 1926. Serial No. 109,044.

This invention relates to fluid pressure brakes, and more particularly to means for automatically effecting successive reductions in brake pipe pressure and consequent successive applications of the brakes. The above method of operating the brakes corresponds with the well known two-application or split reduction method of handling the brakes, especially on long trains, as employed by engineers, in which the engineer first makes a light reduction in brake pipe pressure to effect a light application of the brakes, sufficient to cause the brakes to be lightly applied and then after a time, sufficient to permit the slack to be bunched, the engineer makes a heavier reduction in brake pipe pressure to produce the desired application of the brakes.

The time elapsing before the second reduction in brake pipe pressure is made should be varied to correspond with the time required for the slack to run in and this in turn depends upon the length of the train.

One object of our invention is to provide means for automatically effecting successive reductions in brake pipe pressure in which the time between the end of the first reduction and the beginning of the second reduction is varied according to the time required for effecting the first reduction in brake pipe pressure, so that the longer the train and the longer the time required to effect the first reduction, the longer the time which elapses before the second reduction is started.

Another object of our invention is to provide means for automatically effecting successive reductions in brake pipe pressure, in which failure of the equalizing discharge valve to seat properly will not interfere with obtaining the desired reduction in brake pipe pressure and in which such reduction will either be in the form of successive reductions or a corresponding continuous reduction.

In the accompanying drawing, the single figure is a sectional diagrammatic view of an automatic train control equipment embodying our invention.

As shown in the drawing, the equipment may comprise a brake valve device 1, having an equalizing discharge valve device and having associated therewith an application valve device 2; a valve device 3 for controlling successive reductions in brake pipe pressure; a magnet controlled valve device 4; and an acknowledging valve device 5.

The brake valve device 1 comprises a casing having a valve chamber 6 containing a rotary slide valve 7 adapted to be operated by a handle 8 and said casing contains the equalizing discharge valve device comprising a piston 9 and a brake pipe discharge valve 10 adapted to be operated by said piston.

The chamber 11 at one side of piston 9 is connected to the usual equalizing reservoir 12 and chamber 13 at the opposite side is connected to the usual brake pipe 14.

The application valve device 2 comprises a piston 32 contained in piston chamber 15 and a slide valve 16 contained in valve chamber 17. The split reduction controlling valve device 3 comprises a casing having differential piston chambers 18 and 19 containing pistons 20 and 21 respectively, said pistons being connected by a stem 22 and being adapted to operate a slide valve 23 contained in the intermediate valve chamber 24.

The control valve casing is also provided with a piston chamber 25 containing a piston 26 and a valve chamber 27 containing a slide valve 28 adapted to be operated by piston 26.

The magnet controlled valve device 4 comprises a magnet 29 and double beat valves 30 and 31 adapted to be controlled by said magnet. The magnet is controlled according to the traffic conditions, and when favorable, the magnet is energized. When the traffic conditions are unfavorable, the magnet 29 becomes deenergized.

When energized, the magnet 29 operates to close the valve 30, so that pipe 33, which is connected to piston chamber 15 is closed to the atmosphere. Fluid under pressure is supplied from the main reservoir 34 through pipe 35 and passages 36 and 37 to valve chamber 17 and thence flows through the restricted port 38 in piston 32 to piston chamber 15. Fluid pressures on opposite sides of piston 32 being thus balanced, the spring 39 maintains the piston in its normal release position, as shown in the drawing.

The discharge passage 40 of the discharge valve 10 is open to the atmosphere through a restricted port 41 and said passage is connected through pipe 42 with piston chamber 18 of the control valve device 3, so that said piston chamber is maintained at atmospheric pressure, so long as the discharge valve 10 is held closed. The valve chamber 24 is also maintained at atmospheric pressure, through port 43 in slide valve 23, passage 44, past check valve 45, passage 46, pipe 47, passage 48, cavity 49 in application slide valve 16 and exhaust port 50. The brake pipe 14 is connected through passage 51 with piston chamber 19 and the valve chamber 24 and piston chamber 18 being at atmospheric pressure, the brake pipe pressure in piston chamber 19 holds the piston 21 in its upper position, as shown in the drawing. The lock-up reservoir 52 being connected to passage 44, is also maintained at atmospheric pressure.

In the normal position of slide valve 23, piston chamber 25 is connected to the atmosphere through passage 53, cavity 54 in slide valve 23, passage 55, and restricted exhaust port 56, so that spring 57 holds slide valve 28 and piston 26 in the position shown, the valve chamber 27 being constantly open to the atmosphere through port 58.

The first reduction reservoir 59 is connected to the second reduction reservoir 60 through pipe 61, passage 62, cavity 63 in slide valve 28, passage 64 and pipe 65.

The timing reservoir 66 is open to the atmosphere by way of passage 67, restricted port 68, and past check valve 69 to passage 53 and passage 67 is also open to valve chamber 27 and thus to the atmosphere, in the normal position of slide valve 28, as shown in the drawing.

When the magnet 29 becomes deenergized due to the action of the train control apparatus, the valve 30 is unseated and fluid under pressure is vented from piston chamber 15 of the application valve device 2, through pipe 33 and atmospheric exhaust passage 70.

Piston 32 is then shifted by the fluid pressure in valve chamber 17 and slide valve 16 is moved to a position in which the equalizing reservoir 12 and chamber 11 of the equalizing discharge valve device are connected to the first reduction reservoir 59 through passage 71, cavity 72 in slide valve 16, passage 73 and pipe 61. The pressure in the equalizing reservoir 12 is thus reduced by equalization into the first reduction reservoir 59, according to the relative volumes of said reservoirs, preferably such that the reduction in pressure will be about seven pounds.

Piston 9 is then operated by the brake pipe pressure in chamber 13, so as to open the discharge valve 10 and permit fluid to be vented from the brake pipe 14 to the discharge passage 40. When the brake pipe pressure has been reduced to a degree slightly less than the reduced pressure in the equalizing reservoir 12, the piston 7 operates to close the discharge valve 10.

Fluid vented to the discharge passage 40 flows to the atmosphere through the restricted port 41 at a predetermined rate which is less than the rate at which fluid is discharged from the brake pipe to the passage 40. Consequently, the fluid pressure builds up in pipe 42 and in piston chamber 18 of the control valve device 3. When the fluid pressure in piston chamber 18 has been increased to a predetermined degree, dependent upon the reduction in brake pipe pressure in piston chamber 19, and the relative areas of the pistons 20 and 21, for example, to thirty pounds, the piston 20 is shifted and slide valve 23 is moved to a position in which passage 53 is connected, through cavity 54 in slide valve 23 with passage 74. Passage 74 is supplied with fluid at a pressure less than main reservoir pressure as supplied by a pressure reducing valve device 75, and consequently the piston 26 is shifted by fluid at reducing valve pressure supplied to piston chamber 25, so that slide valve 28 is moved to cut off communication between passages 62 and 64. Consequently during the first reduction in brake pipe pressure, only the first reduction reservoir 59 is connected to the equalizing reservoir 12.

Fluid at reducing valve pressure also flows from passage 53, through the restricted port 68 and passage 67 to the timing reservoir 66, charging said reservoir at a predetermined rate, so long as piston 20 holds slide valve 23 in its lower position. The lock-up reservoir 52 is charged with fluid at brake pipe pressure through passage 76, cavity 49 in application slide valve 16, passage 48, pipe 47, passage 77, cavity 78 in slide valve 23, and passage 44. The movement of slide valve 23 to its lower position also connects valve chamber 24 to the atmosphere, through port 43 and exhaust port 79, so as to prevent possibility of fluid leaking into said valve chamber and building up pressure therein which might interfere with the functioning of the first reduction action.

As the discharge valve 10 moves toward its seat, the rate of flow of fluid from the brake pipe to the discharge passage 40 reduces and when less than the rate of discharge at the exhaust port 41, the pressure in pipe 42 will reduce and consequently the pressure in piston chamber 18, until the brake pipe pressure in piston chamber 19 is sufficient to cause the piston 21 to be shifted to its upper position.

It will be noted that by this arrangement, if the discharge valve should fail to seat due to a particle getting between the valve and its seat, the control valve device will not be prevented from functioning, if the particle is so small that the rate of flow at the discharge valve 10 is less than the rate of flow at the restricted port 41. If the valve 10 sticks open so as to permit a greater flow, then the control valve device will not function, but in this case, the rate of discharge at the valve 10 will be sufficient to cause a continuous discharge of fluid from the brake pipe and thereby a reduction in brake pipe pressure such as to cause a full application of the brakes.

The upward movement of piston 21 causes the slide valve 23 to be shifted, so that passage 53 is connected to the atmosphere through cavity 54, passage 55 and restricted exhaust port 56. The fluid pressure in piston chamber 25 and also in the timing reservoir 66 then reduces at a predetermined rate, and when the pressure in piston chamber 25 has been reduced to a predetermined degree, the spring 57 operates to shift slide valve 28 and piston 26 to the left hand position.

In this movement, slide valve 28 uncovers passage 67, so that fluid under pressure remaining in the timing reservoir 66 is vented to the valve chamber 27 and thus assists the movement of piston 26 toward the left.

In the left hand position of slide valve 28, as shown in the drawing, passages 62 and 64 are connected by cavity 63, so that the first reduction reservoir 59 is now connected to the second reduction reservoir 60 and the fluid pressure in the equalizing reservoir 12 is thus further reduced, by equalization into the second reduction reservoir. The equalizing discharge piston 9 is consequently actuated to again open the discharge valve 10 and thus cause a second reduction in brake pipe pressure.

As in making the first reduction in brake pipe pressure, fluid under pressure is vented to the discharge passage 40 and the pipe 42, causing the pressure in piston chamber 18 to be built up, but piston 20 is prevented from again moving down by reason of the fact that during the first reduction, the pressure in the lock-up reservoir 52 was built up by flow from the brake pipe, as hereinbefore described. The fluid pressure in said reservoir is therefore equalized into valve chamber 24 when the slide valve 23 moves to its upper position and this fluid pressure, acting on the differential area of piston 20, in conjunction with the brake pipe pressure in piston chamber 19, prevents the downward movement of piston 20.

After an automatic application of the brakes has been effected, as hereinbefore described, if the magnet 29 is again energized, the valve 30 will be seated and fluid pressure will be built up in piston chamber 15 of the application valve device 2, by flow from valve chamber 17 through the port 38, and the fluid pressures on opposite sides of piston 32 thus being permitted to equalize, the spring 39 will shift the piston 32 and slide valve 16 back to normal release position.

In the operation of the above described apparatus, the degree of pressure to which the timing reservoir is charged at a predetermined rate through a restricted charging port is dependent upon the time the discharge valve 10 remains open, which in turn is dependent upon the length of the train, the leakage from the brake pipe throughout the train, and the degree of brake pipe pressure. The timing reservoir being charged at a predetermined rate for varying periods of time, thus automatically provides a time period corresponding with the varying train operating conditions.

Having now described our invention, what we claim as new and desire to secure by Letters Patent, is:

1. In a fluid pressure brake, the combination with a brake pipe, of means for automatically effecting successive reductions in brake pipe pressure, and means for regulating the time elapsing between the end of the first and the beginning of the second reduction in brake pipe pressure according to the time consumed in the first reduction.

2. In a fluid pressure brake, the combination with a brake pipe, of means for first effecting a reduction in brake pipe pressure and then a second reduction in brake pipe pressure and means for delaying the second reduction for a period of time between the end of the first reduction and the beginning of the second reduction, which period varies as the period of time varies from the beginning to the end of the first reduction.

3. In a fluid pressure brake, the combination with a brake pipe, of means for effecting a reduction in brake pipe pressure, a timing reservoir, means operated by fluid vented from the brake pipe for supplying fluid under pressure to said reservoir, and means operated upon a predetermined reduction in pressure in said reservoir for effecting a second reduction in brake pipe pressure.

4. In a fluid pressure brake, the combination with a brake pipe, of means for effecting a reduction in brake pipe pressure, a timing reservoir, a source of fluid under pressure, means operated during the period the brake pipe pressure is reducing for supplying fluid under pressure from said source to said reservoir, and means operated upon a predetermined reduction in pressure in said reservoir for effecting a second reduction in brake pipe pressure.

5. In a fluid pressure brake, the combination with a brake pipe, of means for effecting a reduction in brake pipe pressure, a timing reservoir, a source of fluid under pressure, a valve device operated by fluid vented from the brake pipe for supplying fluid from said source to said reservoir, a valve device subject to the pressure of fluid in said reservoir and operated upon a predetermined reduction in pressure in said reservoir for effecting a second reduction in brake pipe pressure.

6. In a fluid pressure brake, the combination with a brake pipe, of means for effecting a reduction in brake pipe pressure, a timing reservoir, a source of fluid under pressure, a valve device operated by fluid vented from the brake pipe for supplying fluid from said source to said reservoir, a valve device subject to the pressure of fluid in said reservoir and operated upon a predetermined reduction in pressure in said reservoir for effecting a second reduction in brake pipe pressure, the first mentioned brake device being operated upon cessation of the first venting of fluid from the brake pipe for venting fluid from said reservoir.

7. In a fluid pressure brake, the combination with a brake pipe, of a timing reservoir, a first reduction reservoir, a second reduction reservoir, a discharge valve device operated upon a reduction in fluid pressure for venting fluid from the brake pipe, means for connecting said discharge valve device to the first reduction reservoir, a cut-off valve device subject to the pressure in said timing reservoir for controlling communication from the first to the second reduction reservoir, and a valve device having one position for supplying fluid under pressure to said timing reservoir, and another position in which fluid is vented from said reservoir.

8. In a fluid pressure brake, the combination with a brake pipe, of means for effecting successive reductions in brake pipe pressure including a first reduction reservoir, a second reduction reservoir, and a valve device for connecting the first to the second reduction reservoir, and a valve device for controlling the first mentioned valve device and subject to the opposing pressures of the brake pipe and fluid vented from the brake pipe in effecting a reduction in brake pipe pressure.

9. In a fluid pressure brake, the combination with a brake pipe, of means for effecting successive reductions in brake pipe pressure including a controlling valve device subject to the opposing pressures of the brake pipe, and fluid vented from the brake pipe in effecting a reduction in brake pipe pressure.

10. In a fluid pressure brake, the combination with a brake pipe, of means for effecting successive reductions in brake pipe pressure including a controlling valve device comprising connected pistons having differential areas, one piston being subject to brake pipe pressure and the other to the pressure of fluid vented from the brake pipe in effecting a reduction in brake pipe pressure.

11. In a fluid pressure brake, the combination with a brake pipe, of means for effecting successive reductions in brake pipe pressure including a controlling valve device comprising connected pistons having differential areas, one piston being subject to brake pipe pressure and the other to the pressure of fluid vented from the brake pipe in effecting a reduction in brake pipe pressure, a reservoir adapted to be charged with fluid under pressure in one position of said valve device and adapted to be connected to the chamber intermediate said pistons in another position of said valve device.

12. In a fluid pressure brake, the combination with a brake pipe, of means for effecting successive reductions in brake pipe pressure including a timing reservoir, a source of fluid under pressure, and a valve device having one position for supplying fluid under pressure from said source to said reservoir at a predetermined restricted rate and another position in which fluid is vented from said reservoir.

13. In a fluid pressure brake, the combination with a brake pipe, of means for effecting successive reductions in brake pipe pressure including a timing reservoir, means controlled by the fluid pressure in said reservoir for initiating a second reduction in brake pipe pressure, and means for charging said reservoir at a predetermined restricted rate while the first reduction in brake pipe pressure is being effected.

14. In a fluid pressure brake, the combination with a brake pipe, of means for effecting successive reductions in brake pipe pressure including a timing reservoir, a source of fluid under pressure, and a valve device having one position for supplying fluid under pressure from said source to said reservoir at a predetermined restricted rate and another position in which fluid is vented from said reservoir at a predetermined restricted rate.

In testimony whereof we have hereunto set our hands.

THOMAS H. THOMAS.
EARLE S. COOK.